United States Patent
Price

(10) Patent No.: US 10,643,221 B1
(45) Date of Patent: May 5, 2020

(54) AMATEUR ADVERTISEMENT NETWORK WITH REVENUE SHARING

(75) Inventor: Roy F. Price, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1722 days.

(21) Appl. No.: 12/854,714

(22) Filed: Aug. 11, 2010

(51) Int. Cl.
G06Q 30/00 (2012.01)
G06Q 30/02 (2012.01)

(52) U.S. Cl.
CPC .................... G06Q 30/02 (2013.01)

(58) Field of Classification Search
CPC ....................................... G06Q 30/02
USPC ................ 705/14.49, 14.73, 14.61, 14.66; 707/999.01; 725/34
See application file for complete search history.

(56) References Cited

U.S. PATENT DOCUMENTS

| | | |
|---|---|---|
| 2005/0278443 A1 | 12/2005 | Winner et al. |
| 2008/0140502 A1* | 6/2008 | Birnholz et al. ............... 705/10 |
| 2009/0048921 A1 | 2/2009 | Tokuda et al. |
| 2009/0119165 A1 | 5/2009 | Cotgreave |
| 2009/0119167 A1 | 5/2009 | Kendall et al. |
| 2009/0132341 A1* | 5/2009 | Klinger et al. ................ 705/10 |
| 2010/0185507 A1* | 7/2010 | Tokuda ...................... 705/14.41 |
| 2010/0186032 A1* | 7/2010 | Pradeep ............... G11B 27/105 725/38 |
| 2011/0066497 A1 | 3/2011 | Gopinath et al. |
| 2011/0179359 A1 | 7/2011 | Nussel et al. |

OTHER PUBLICATIONS

Non-Final Office Action for U.S. Appl. No. 12/854,647, dated Jul. 27, 2012, Roy F. Price, "Amateur Advertisement Network", 24 pages.
Office action for U.S. Appl. No. 12/854,647, dated Dec. 17, 2012, Price, "Amateur Advertisement Network", 34 pages.
Office action for U.S. Appl. No. 12/854,647 dated Sep. 4, 2015, Price, "Amateur Advertisement Network", 50 pages.
Office Action for U.S. Appl. No. 12/854,647, dated Apr. 30, 2015, Roy F. Price, "Amateur Advertisement Network", 34 pages.

* cited by examiner

*Primary Examiner* — Sun M Li
(74) *Attorney, Agent, or Firm* — Lee & Hayes, P.C.

(57) ABSTRACT

An amateur advertisement service is described which distributes and generates revenue from personalized advertisements produced by creators featuring an item for purchase. The personalized advertisements may be created in response to requests supplied by manufacturers of the items to be featured in the personalized advertisements. Each of the personalized advertisements can be assigned unique identifiers to index and organize the ads for viewing by others. Associate websites may provide links to the amateur advertisement service to allow certain personalized ads to be viewed from the associate websites. Revenue can be generated based on the viewing of ads and/or the purchase of the items featured in the ads and distributed to the creators, associate websites and the amateur advertisement service.

33 Claims, 12 Drawing Sheets

AMATEUR ADVERTISEMENT NETWORK WITH REVENUE SHARING

BACKGROUND

The Internet has boosted the transfer of control for media to the public. Along with the ability to search for and watch professionally produced programming at their leisure, members of the public have unlimited access to media created by ordinary people and posted on media sites such as YouTube. Further, people are able to share media with their family, friends and colleagues through social networking sites like Facebook™ and MySpace™.

Online advertising has also grown and evolved in response to the popularity of media and social networking websites. Banner ads, pop up ads, sponsored link ads and comparison shopping ads are among the types readily available on the web. However, advertisers are constantly challenged with providing targeted audiences with effective advertisements that ultimately lead to sales. One traditional format used to accomplish the foregoing utilizes individuals familiar to and trusted by members of a target audience to endorse a product by providing testimonials or a positive opinion about their own experience with the product. In most cases, popular sports figures or celebrities have enough sway with an audience to convince them to support the endorsed product.

Finding new ways to utilize trusted relationships to market products and services to online audiences continues to garner interest from advertisers in light of the relatively low costs and high dissemination rate of the Internet.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

An amateur advertisement network is described that provides personalized advertisements (or simply "personalized ads") created by members of a network to be distributed to others having a relationship with the creator(s). Access to the personalized advertisements can be in the form of a link to an amateur advertisement service. The personalized ads can be produced in response to a request made from a manufacturer or provider of the item(s) to be featured in the personalized ads. Viewers of the personalized ads can also purchase the featured items from designated retailers provided therein.

The personalized ads can be assigned unique identifiers associated with a feature of the personalized ads. The unique identifiers may be used to organize and track data associated with the personalized ads.

Viewers of the personalized ads may be related to the creators by a social graph. In another exemplary embodiment, viewers may view the personalized ads through an associate website with a link to the amateur advertisement service. Further, viewers may purchase the items featured in the personalized ads during or after viewing them. The term associate website refers to a website associated with an entity or individual independent from the amateur advertisement network. In this respect, the personalized ads may designate a specific retailer to fulfill a purchase request. In one implementation, the retailer can be designated by the creators, amateur ad service or manufacturers.

The term retailer refers to an entity or individual offering for sale and selling products or services to the public through brick-and-mortar establishments or via the Internet.

Revenue may be generated from the display of the personalized ads and/or the purchase of the featured items therein. The generated revenue may also be distributed to the creators of the personalized ads, amateur advertisement network and associate websites. In one implementation, distribution of the revenue is governed by a predefined agreement.

This disclosure includes the following sections. Section A describes an exemplary amateur advertisement network and features associated therein. Section B describes exemplary modules that can be incorporated in an amateur advertisement network. Section C describes exemplary user interface presentations that can be provided by the amateur advertisement network. Section D describes exemplary procedures of the amateur advertisement network. Section E describes an exemplary flow of revenue associated with the amateur advertisement network. And Section F describes exemplary revenue generating and distributing procedures of the amateur advertisement network.

A. Exemplary Architecture

Figure 1:
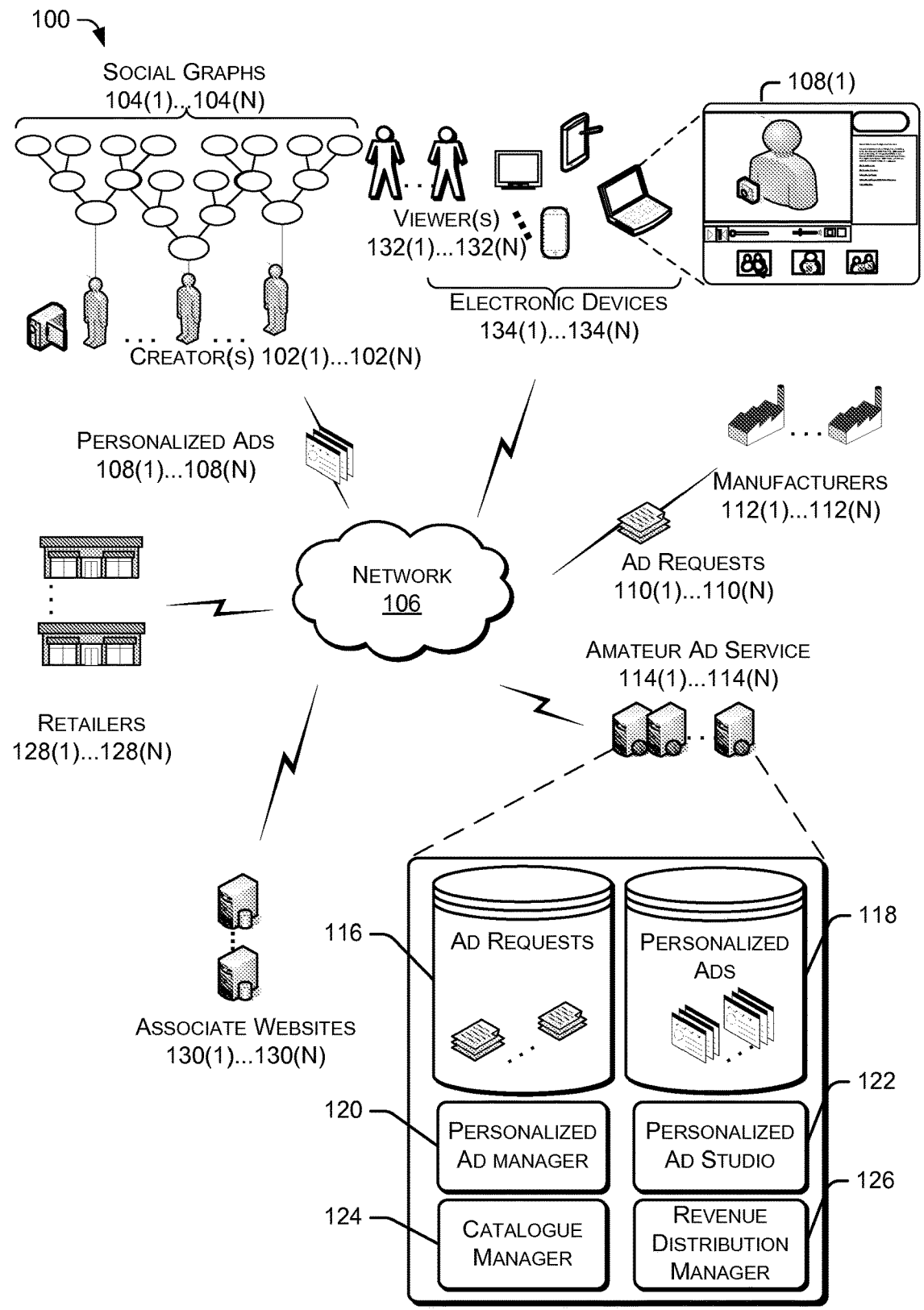
FIG. 1 illustrates an example architecture having an amateur advertisement service that provides personalized advertisements produced by creators in response to advertisement requests from manufacturers of the items featured in the personalized advertisements for distribution to electronic devices.

FIG. 1 shows an overview of one exemplary amateur advertisement architecture 100. In this amateur advertisement architecture 100, many creators (or users) 102(1) . . . (N) are illustrated. The users 102(1) . . . (N) may comprise of any kind of individual or entity. In certain implementations, the users 102(1) . . . (N) belong to social graphs 104(1) . . . (N). The social graphs 104(1) . . . (N) may comprise of networks of individuals or organizations which are connected to one another by one or more types of qualities, including friendship, kinship, common interest, financial exchange, relationships of beliefs, knowledge, demographics or geography. Further groupings of members belonging to the social graphs 104(1) . . . (N) may occur based on any one or more of the forgoing interdependencies. In one example implementation, the social graphs 104(1) . . . (N) may overlap so that membership may overlap between the social graphs 104(1) . . . (N). In another implementation, the social graphs 104(1) . . . (N) may be formed and maintained on social networking websites such as Facebook®, MySpace™, LinkedIn®, Twitter™ and so on. A network 106 is provided and is representative of any one or combination of multiple different types of networks, such as cable networks, the Internet, and wireless networks.

The creators 102(1) . . . (N) may be required to register with the amateur ad service 114(1) . . . (N) and accept terms and conditions governing their conduct. Moreover, the terms and conditions may set forth specifics on how the creators 102(1) . . . (N) may produce personalized ads 108(1) . . . (N), how those ads 108(1) . . . (N) can be used, and how the creators 102(1) . . . (N) may be compensated. The users 102(1) . . . (N) may create personalized advertisements 108(1) . . . (N) featuring one or more items available for purchase. The personalized advertisements 108(1) . . . (N) may comprise of personal testimonials, opinions or endorsements of the featured items in any kind of form, including video, audio, text, combined video and audio, and so on. In an exemplary implementation, the personalized ads 108(1) . . . (N) may further comprise of display advertisements containing text, photographs, graphics, banners, logos, maps, or other images in static or animated form. In one exemplary implementation, the personalized ads 108(1) . . . (N) may be produced in response to advertisement requests 110(1) . . . (N), submitted by manufacturers 112(1) . . . (N) of an item it seeks to market. Manufacturers 112(1) . . . (N) may refer to entities or individuals associated with a product or service including, merchants, advertising agents, brokers, distributors and retailers. In one implementation, the ad requests 110(1) . . . (N) comprise of a set of rules or guidelines that should be adhered to for the content of the personalized ads 108(1) . . . (N), including a minimum or maximum number of times the item must be displayed, language, genre (e.g., comedy, mystery, romance, etc.) actors, scenery, music, dialogue, duration and so on. The ad requests 110(1) . . . (N) may further include eligibility requirements regarding the creators 102(1) . . . (N), including experience, performance history, fee requirements, geographic location, etc. For example, creators 102(1) . . . (N) with a past history of creating successful and/or popular advertisements may increase the interest of manufacturers 112(1) . . . (N) to enlist their services over creators 102(1) . . . (N) with less stellar track records or who are just starting out.

Architecture 100 includes an amateur ad service 114(1) . . . (N) which collects and distributes the personalized ads 108(1) . . . (N). The amateur ad service 114(1) . . . (N) is hosted on one or more servers 115(1) . . . (N). The one or more servers 115(1) . . . (N) consist of computers (e.g. as a "farm" of such computer servers) and associated databases. The databases may include an ad request database 116 capable of storing advertisement requests 110(1) . . . (N) and a personalized advertisement database 118 for storing personalized ads 108(1) . . . (N).

Further, the amateur advertisement service 114(1) . . . (N) includes various functionality for conducting the amateur ad service 114(1) . . . (N), including a personalized ad manager 120, personalized ad studio 122, catalogue manager 124 and revenue distribution manager 126.

In one implementation, the personalized ad manager 120 organizes, manages and distributes the personalized ads 108(1) . . . (N). Unique identifiers may be assigned to the personalized ads 108(1) . . . (N) based on the item featured therein, identity of the creators 102(1) . . . (N), product or service category, brand, creation date, genre, and so on. The unique identifiers may be used to organize the personalized ads 108(1) . . . (N) into one or more channels for viewing groups of personalized advertisements 108(1) . . . (N). Channels may correspond to the unique identifiers or may be defined around celebrities, brands, retail stores or concepts (e.g. Suzanne Sommers, Black & Decker™, Target.com, summer 2010 fashion, etc.).

In another implementation, the personalize ad manager 120 facilitates navigation of the personalized advertisements 108(1) . . . (N) via search. The personalized advertisements 108(1) . . . (N) may be accessed based upon creators 102(1) . . . (N), subject matter, item, creation date, popularity, recommendations and so on. The personal ad studio 122 may include tools and resources available to creators 102(1) . . . (N) to enhance the personalized ads 108(1) . . . (N). The catalogue manager 124 can incorporate catalogues from retailers 128(1) . . . (N) bearing items available for purchase with the personalized ads 108(1) . . . (N). The revenue distribution manager 126 may distribute revenue generated from the display of the personalized ads 108(1) . . . (N) and/or purchase of the items featured therein throughout the amateur advertisement architecture 100. The foregoing features are further described in the discussion accompanying FIG. 2.

Retailers 128(1) . . . (N) may supply the featured item in the personalized ads 108(1) . . . (N). For example, the personalized ads 108(1) . . . (N) may designate a specific retailer 128(1) . . . (N) as a preferred supplier of the items to anyone seeking to purchase the items. In certain implementations, the retailers 128(1) . . . (N) may provide links to the amateur advertisement service 114(1) . . . (N) from their own websites.

Continuing with FIG. 1, associate websites 130(1) . . . (N) can provide links to the amateur advertisement service 114(1) . . . (N) on its pages to access the personalized ads 108(1) . . . (N). The links can be set to provide certain kinds of personalized ads 108(1) . . . (N) based in part on the unique identifiers, category of items, creator, channels, key word or other identifying information. In a certain implementation, the links can provide alternative formats for the personalized ads 108(1) . . . (N) displayed. For example, clicking on a link may trigger a pop up media player to start the personalized ads 108(1) . . . (N) while in an alternative format, clicking on the link allows the personalized ads 108(1) . . . (N) to play with the personalized ads 108(1) . . . (N) becoming a hotlink to a target site. The target site may include the web pages of the item(s) featured in the personalized ads 108(1) . . . (N), the creators 102(1) . . . (N), the retailers 128(1) . . . (N), the manufacturers 112(1) . . . (N) and other sites related to the subject matter of the personalized ads 108(1) . . . (N) or the associate websites 130(1) . . . (N). For example, a personalized ad for Nike® golf balls can be displayed upon clicking on a link available on http//www.golfdiget.com. During or after completion of the personalized ad 108(1) . . . (N), an overlay may appear providing "click to go to http//www.golfnow.com to make tee times on courses around your area!"

In some cases, the associate websites 130(1) . . . (N) may provide preferences to the amateur ad services 114(1) . . . (N) regarding the content of the personalized ads 108(1) . . . (N) to be provided by the link. The preferences may include the type of ad 108(1) . . . (N) (e.g. comedy, romance, children, adult, women, men, etc.), creators 102(1) . . . (N), products or services featured in the ads 108(1) . . . (N), music, genre, popularity, playback time, and so on. For example, a website directed towards men may prefer personalized ads 108(1) . . . (N) for sporting equipment, consumer electronic goods, sporting events and so forth. In one implementation, information stored on a viewer's browser by a cookie can be used to store preferences specific to the viewer 132(1) . . . (N). The preferences can identify the social graphs 104(1) . . . (N) affiliated with the viewer 132(1) . . . (N) and therefore determine networks of individuals or organizations connected with the viewer 132(1) . . . (N). The foregoing feature is further described below in the discussion accompanying FIG. 5.

Viewers 132(1) . . . (N) can use electronic devices (or devices) 134(1) . . . (N) to view the personalized ads 108(1), . . . , 108(N) (detailed below). The devices 134(1) . . . (N) represent any kind of electronic unit which can interact with the amateur advertisement service 114(1) . . . (N) via the network 106. In the most common case, the devices 134(1) . . . (N) correspond to compute devices, such as personal computers, laptop computers, and so forth. But any of the devices 134(1) . . . (N) may also correspond to any kind of wearable computer, a mobile telephone, a Personal Digital Assistant (PDA) device, a stylus type input device, a game console device, and so forth. In one implementation, viewers 132(1) . . . (N) can be members of the social graphs 104(1) . . . (N) with a relationship with the creators 102(1) . . . (N) of the personalized ads 108(1) . . . (N). Viewers 132(1) . . . (N) may also be allowed to purchase the items featured in the personalized ads 108(1) . . . (N) during or after viewing them. In a specific implementation, purchase of the times featured in the personalized ads 108(1) . . . (N) generates revenue that may be apportioned to the creators 102(1) . . . (N) and/or others associated with the amateur ad architecture 100. Details of distributing revenue based on the purchase of items featured in the personalized ads 108(1) . . . (N) will be detailed further with reference to FIG. 7 below.

B. Exemplary System

Figure 2:
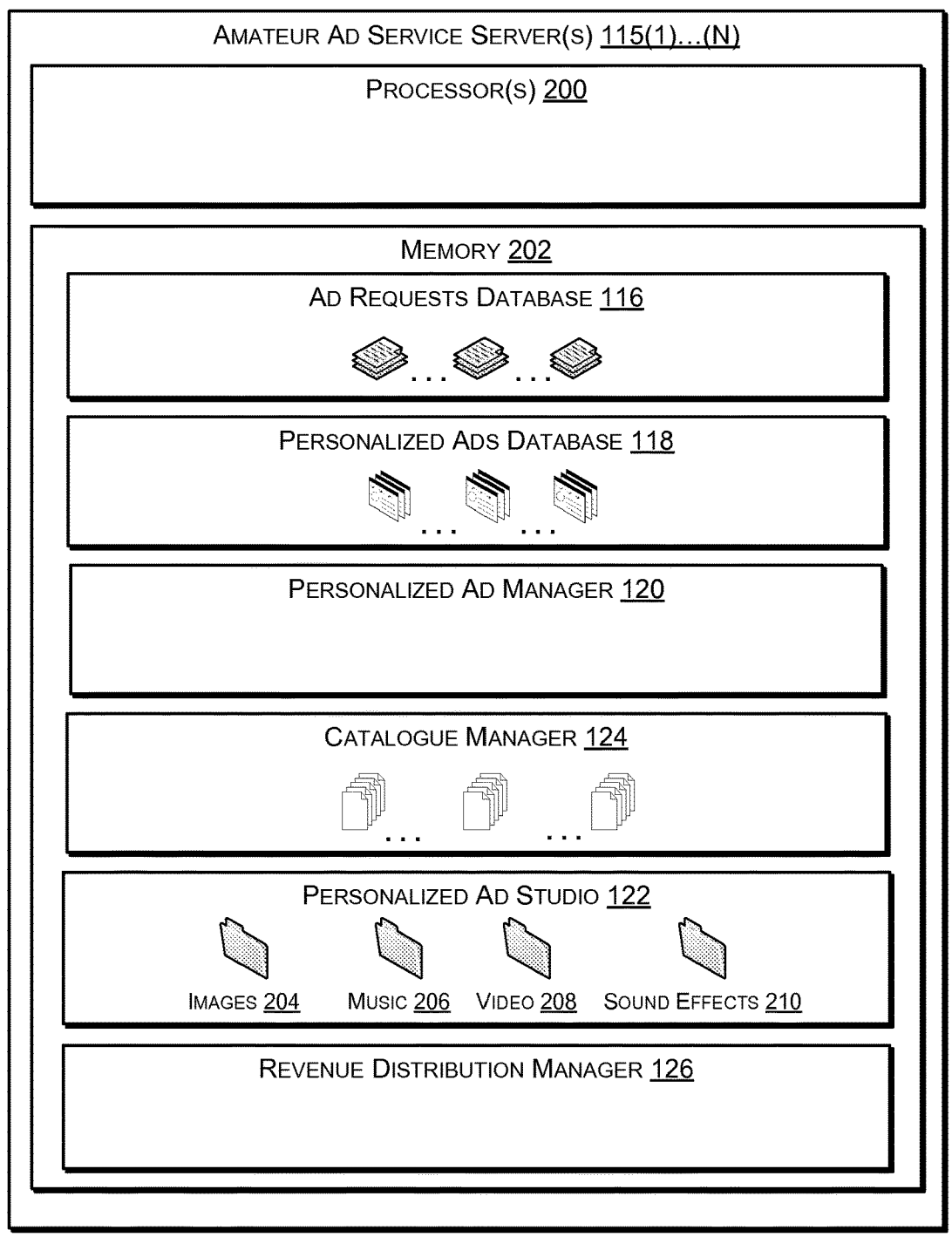
FIG. 2 is a block diagram illustrating selected modules that implement the amateur advertisement service.

FIG. 2 illustrates an example implementation of certain components that might be used to implement amateur advertisement services 114(1) . . . (N) and revenue distribution models. The components are shown implemented on one or more of the web servers 115(1) . . . (N) that host the amateur ad service 114(1) . . . (N). The web server(s) 115(1) . . . (N) have processing capabilities and memory suitable to store and execute computer-executable instructions. In FIG. 2, the web server(s) 115(1) . . . (N) include one or more processors 200 and memory 202. The memory 202 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

A set of ad requests 110(1) . . . (N) and personalized ads 108(1) . . . (N) may be stored in database 116 and 118, respectively and stored in the memory 202. The ad requests 116 may be supplied by manufacturers 112(1) . . . (N) or other entities soliciting personalized ads 108(1) . . . (N) for products or services available for purchase or providing information. In one case, the ad requests 110(1) . . . (N) may specify mandatory details to be included in the personalized ads 108(1) . . . (N) including features such as language, genre, style, duration, music, logos, catch phrases, characters and so on. In other cases, certain ad requests 110(1) . . . (N) may specify preferred features of the personalized ads 108(1) . . . (N) and therefore provide the creators 102(1) . . . (N) with greater creative latitude. Further, the ad requests 110(1) . . . (N) may also designate a retailer 128(1) . . . (N) as a supplier of the item featured in the personalized ads 108(1) . . . (N) in instances where viewers 132(1) . . . (N) are permitted to purchase the featured item in the personalized ads 108(1) . . . (N). In some cases, the relationship between the manufacturers 112(1) . . . (N) and the retailers 128(1) . . . (N) can be dictated by an agreement. In certain implementations, the designated retailer 128(1) . . . (N) may comprise of different entities depending upon a location of the viewers 132(1) . . . (N). The ad requests 110(1) . . . (N) may also include eligibility requirements for potential creators 102(1) . . . (N) of the personalized ads 108(1) . . . (N) created in response thereto. In one implementation, the creators' 102 (1) . . . (N) past performance with creating successful personalized ads 108 (1) . . . (N) may be used to determine her eligibility, including viewership of previously created ads, frequency of purchases attributable to the previously created ads, popularity of the ads, and so forth. Further, the eligibility requirements may include factors directly associated with the creator 102(1) . . . (N), including, required production fee, amount of revenue share, location, number of members in her social graph(s) 104(1) . . . (N), demographic information, age, sex, education, and so on.

The personalize ads 108(1) . . . (N) may include video, audio, text or any combination thereof in digital format created by any entity or individual. In certain implementations, notwithstanding the rules imposed by the ad requests 110(1) . . . (N), creators 102(1) . . . (N) may be granted substantial artistic license to include content to freely express her opinions, endorsement or testimonial towards the featured item of the personalized ads 108(1) . . . (N).

The personalized ad manager 120 is shown implemented as software or computer-executable instructions stored in the memory 202 and executed by the one or more processors 200. As the name suggests, the purpose of the personalized manager 120 is to administer and manage the flow of operations with the amateur ad service 114(1) . . . (N) and between the parts which comprise the amateur ad architecture 100. The personalized ad manager 120 may assign unique identifiers to the personalized ads 108(1) . . . (N) corresponding to the featured item contained therein, the creator, subject matter, genre, date, length, or any other characteristic associated with the personalized ads 108(1) . . . (N). The unique identifiers are any kind of text, numbers, symbols, lines, or any combination thereof used to distinguish elements from one another. In one implementation, the unique identifiers may be used to assign the personalized ads 108(1) . . . (N) into different channels for viewing convenience. Each of the channels may correspond to the aforementioned features associated with the unique identifiers and/or correspond to other topics including, most viewed ads, price of the featured items, product lines, retail stores, concepts and so forth. Because of this provision, the personalized ads 108(1) . . . (N) may also be searchable by the unique identifiers, keywords or other characteristics attached to each of the personalized ads 108(1) . . . (N).

In yet another implementation, the personalized ad manager 120 may obtain, maintain and analyze performance data associated with the personalized ads 108(1) . . . (N) including measurements of viewership, distribution, popularity and effectiveness of the personalized ads 108(1) . . . (N). For example, purchases of the featured items in the personalized ads 108(1) . . . (N) by viewers 132(1) . . . (N) during or after watching the personalized ads 108(1) . . . (N) contributes to agreeable performance data attributable to the personalized ads 108(1) . . . (N). The performance information may also track data associated with the creator 102(1) . . . (N) including quantity and quality information associated with her personalized ads 108(1) . . . (N). For example, personalized ads 108(1) . . . (N) started and continued to be viewed until their conclusion may be tracked along with those personalized ads 108(1) . . . (N) which are partially viewed or fast forwarded through. Moreover, repeat viewing by the viewers 132(1) . . . (N) of the same personalized ad 108(1) . . . (N) during a given session may also be noted. In the foregoing instances, creators 102(1) . . . (N) of the personalized ads 108(1) . . . (N) which receive positive feedback from viewers 132(1) . . . (N) may be credited accordingly. The performance information may also be accessible to manufacturers 112(1) . . . (N) in order to assess the qualifications of the creators 102(1) . . . (N) responding to a solicitation made through advertisement requests 110(1) . . . (N).

The catalogue manager 124 can synchronize catalogues or other similar materials originating from retailers 128(1) . . . (N) seeking to sell the same or similar products or services with the featured items in the personalized ads 108(1) . . . (N). In one case, retailers 128((1) . . . (N) may be preselected by the manufacturer 112(1) . . . (N) or designated as such in the ad requests 110(1) . . . (N). In another case, retailers 128(1) . . . (N) may enter bids to become the designated retailer 128(1) . . . (N) to supply the items to purchasers.

The personalized ad studio 122 may provide resource to the creators 102(1) . . . (N) to enhance or complement the personalized ads 108(1) . . . (N). The personalized studio 122 may include editing tools as well as video and audio effects to allow creators to upgrade their personalized ads 108(1) . . . (N) to professional quality productions. It will be appreciated that the editing tools and effects available to the creators 102(1) . . . (N) can include commercially available computer programs or parts thereof. In a particular implementation, the personalized ad studio 122 may comprise of a library of files storing and offering images 204, music 206, video 208 and sound effects 210 for inclusion into the personalized ads 108(1) . . . (N). The contents of the library of files 204, 206, 208, 210 may be licensed from rights holders of the works or may consist of materials available in the public domain. Moreover, creators 102(1) . . . (N) may provide their produced personalize ads 108(1) . . . (N) or parts therein, including images, music, sound, etc, to the library of files 204, 206, 208, 210 for free or in exchange for a licensing fee.

The revenue distribution manager 126 is provided to distribute revenue generated by the personalized ads 108(1) . . . (N). In one implementation, revenue can be generated by displaying the personalized ads 108(1) . . . (N), including attaching the amount of revenue generated in proportion to the length of viewing of the personalized ads 108(1) . . . (N). For example, viewers 132(1) . . . (N) may click on a link to the personalized ads 108(1) . . . (N) to start viewing the same. As mentioned previously, the personalized ad manager 120 can track viewers' 132(1) . . . (N) behavior vis-à-vis the displayed advertisement. Specifically, actions such as fast forwarding, skipping, pausing, stopping, decreasing volume, muting or decreasing, minimizing or closing the window displaying the personal ads 108(1) . . . (N), etc. may indicate disinterest by viewers 132(1) . . . (N). In these situations, the amount of revenue may be decreased. On the other hand, actions such as rewinding, pausing, increasing volume, forwarding to others, repeating, enlarging the window displaying the advertisement, etc. may indicate interest by viewers 132(1) . . . (N) and accordingly, the amount of revenue may increase.

In another example, the revenue distribution manager 126 may distribute revenue generated based on the purchase of an item as a result of the item being featured in the personalized ads 108(1) . . . (N) viewed by the purchaser. That is, viewers 132(1) . . . (N) watching the personalized ads 108(1) . . . (N) may wish to purchase the featured item(s) and proceed to do as much during or after the personalized ad(s) 108(1) . . . (N) is completed. Based on a successful purchase transaction, revenue is generated for disbursement to the creators 102(1) . . . (N) of the personalized ad(s) 108(1) . . . (N) responsible for the purchase transaction. In another implementation, associate websites 130(1) . . . (N) may provide viewers 132(1) . . . (N) with a link accessing the personalized ads 108(1) . . . (N). Similarly, viewers 132(1) . . . (N) may seek to purchase the featured item(s) during or after completion of the personalized ad(s) 108(1) . . . (N). Revenue generated based on a completed purchase may be apportioned to the associated websites 130(1) . . . (N), creators 102(1) . . . (N) and/or the amateur ad service 114(1) . . . (N). The amounts apportioned may be agreed upon by a predefined agreement providing details regarding the conditions and terms under which revenue is to be apportioned. It will be appreciated that other methods of compensation may be utilized, including methods based on cost per click, cost per action, cost per impression, cost per mile, cost per visitor, cost per view, cost per conversion, cost per engagement, etc.

C. Exemplary User Interface

Figure 3A:
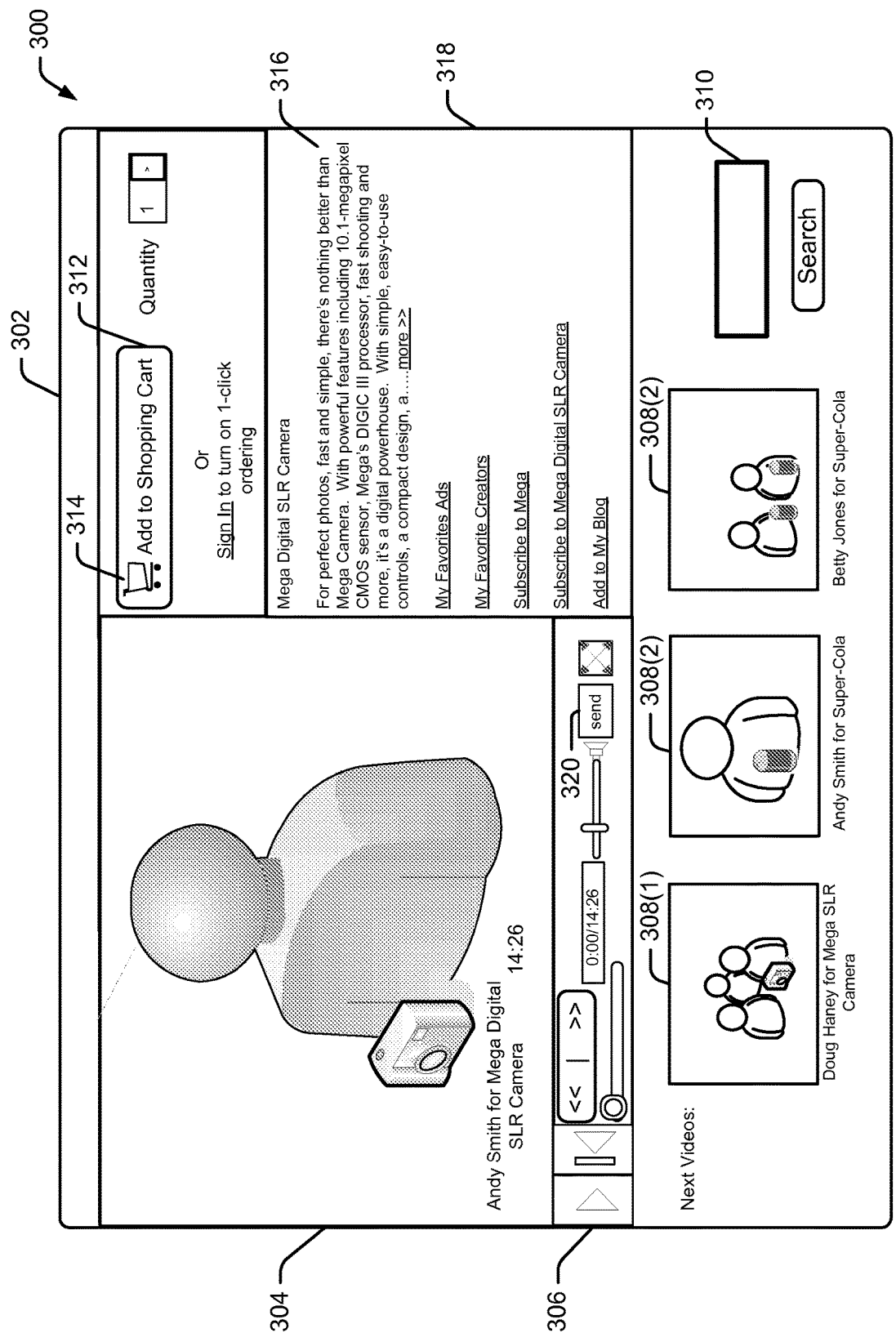
FIG. 3A illustrates a screen rendering of an exemplary browser user interface for displaying personalized advertisements.

FIG. 3A shows an exemplary user interface 300 to present the personalized ads 108(1) . . . (N) to viewers 132(1) ... (N). When selected by viewers 132(1) ... (N), the personalized ads 108(1) ... (N) may be presented either in a pop-up player or, as illustrated in FIG. 3, in a browser 302. While watching the personalized ads 108(1) ... (N), viewers may navigate play of a personalized ad 304 with control buttons 306. As noted above, actions by viewers 132(1) ... (N) with respect to the navigation control buttons 306 may be tracked and applied to characterize the personalized ads 108(1) ... (N), creators 102(1) ... (N) and so on. In one case, a sequence of personalized ads 308(1), 308(2), 308(3) displayed to viewers 132(1) ... (N) may be determined by the viewers' selection, popularity, purchase rates, newest ads, and so on. Moreover, the subsequent personalized ads 308(1), 308(2), 308(3) may be related to the currently playing personalized ad 304 by the same creator, featured item(s), category, items complementary to the featured item(s), etc. and may separately be queued for display. Viewers who do not want to view the sequence of the personalized ads 308(1), 308(2), 308(3) as presented by the amateur ad service 114(1) ... (N) may select any one of the subsequent ads 308(1), 308(2), 308(3) for viewing at their leisure. In another case, in the event viewers selected a channel for viewing the personalized ads 304 presented therein, as previously mentioned, the subsequent ads 308(1), 308(2), 308(3) may be included within the selected channel. In a further example, a search box 310 can receive search queries for searching for individual personalized ads 108(1) ... (N). A search query summons a list and/or a graphic depiction of individual personalized ads 108(1) ... (N) that match the search query. If the viewer clicked on any one of the personalized ads 108(1) ... (N) from the hit list, the subsequent ads 308(1), 308(2), 308(3) will be within the same search result.

In yet another implementation, viewers may purchase the featured item(s) in the personalized ads 304. As depicted in FIG. 3, viewers 132(1) ... (N) may shop in a simplified mode or normal mode. In the simplified mode, viewers 132(1) ... (N) may click a buy button before, during or at the end of the personalized ad 304 and the transaction is complete. It will be appreciated that this function requires viewers 132(1) ... (N) to have been pre-registered with the amateur ad service 114(1) ... (N) and/or retailers 128(1) ... (N) supplying the featured item(s). In the normal mode, an "Add to Shopping Cart" button 312 is provided. When the viewers 132(1) ... (N) are ready to purchase the featured item(s), they simply presses the "Add to Shopping Cart" button 312 and is provided with two options: "Proceed to Checkout" or "Return to Video". Selecting the latter will return the viewers 132(1) ... (N) back to the previous place with the shopping cart icon 314 visibly changed to indicate the presence of an item. At any time thereafter, viewers 132(1) ... (N) can click the shopping cart icon 314 to proceed to Checkout to purchase the featured item(s).

To assist the viewers 132(1) ... (N) with purchasing decisions, the personalized ads 304 may be accompanied by a description of the featured item(s) 316. The description 316 may be provided by manufacturers 112(1) ... (N), creators 102(1) ... (N) or others, including members of a social graph 104(1) ... (N), etc. Furthermore, additional options 318 may be provided to the viewers 132(1) ... (N) regarding the personalized ads 304 currently displayed, creators 102(1) ... (N), or the featured item(s) including selecting the personalized ad 304 and/or the creator as a favorite, subscribing to the a manufacturer or the specific featured item(s) and so forth. Also, functions 320 related to distributing the personalized ads may conveniently be provided.

Figure 3B:
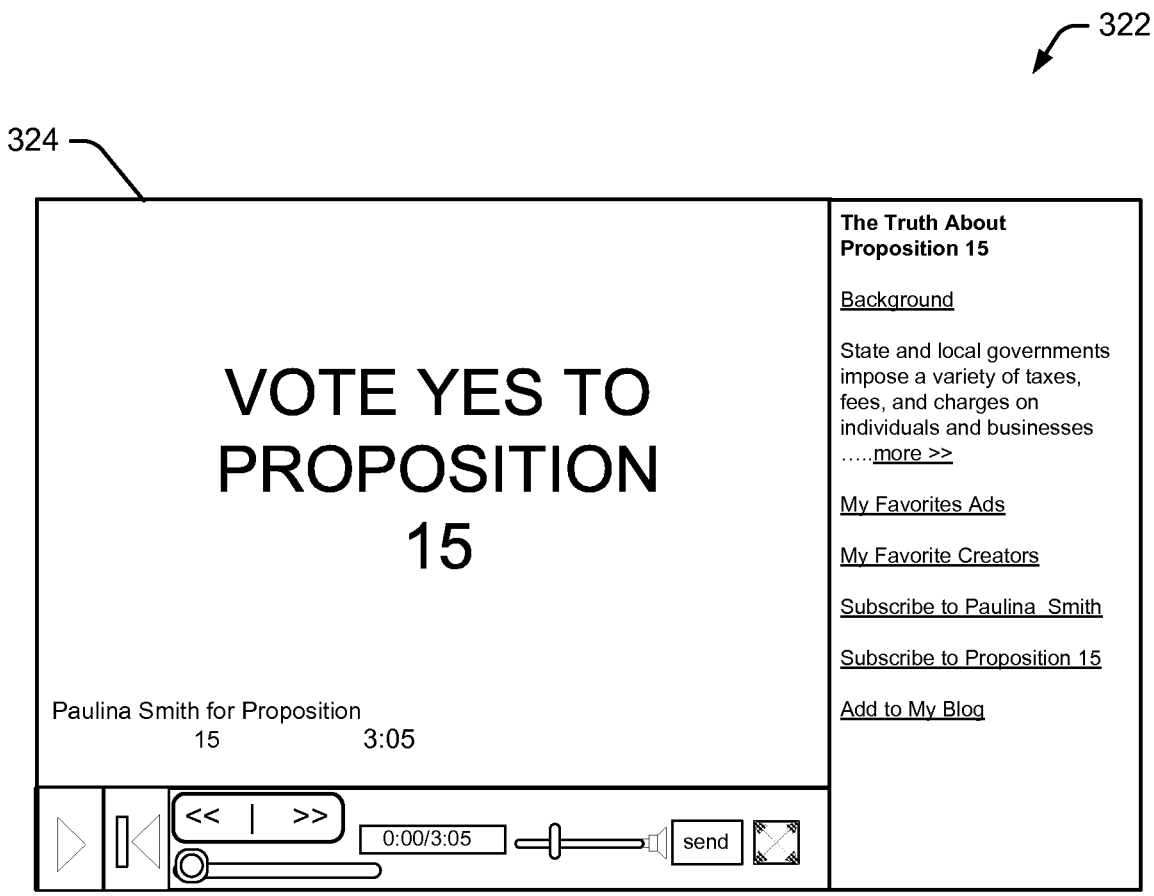
FIG. 3B illustrates a screen rendering of an exemplary user interface for presenting display advertisements.

FIG. 3B shows an exemplary user interface 322 to present display advertisements 324. As previously mentioned, the personalized ads 108(1) ... (N) may comprise of personal testimonials, opinions or endorsements in the form of text, photographs, graphics, banners, logos and so forth. In one implementation, the display advertisement 324 is associated with noncommercial editorials and opinions. For example, a creator may wish to express her support for a proposition on a ballot in an upcoming election and share them with members of her social graph 104(1) ... (N).

D. Exemplary Procedures (FIGS. 4-6)

Figure 4:
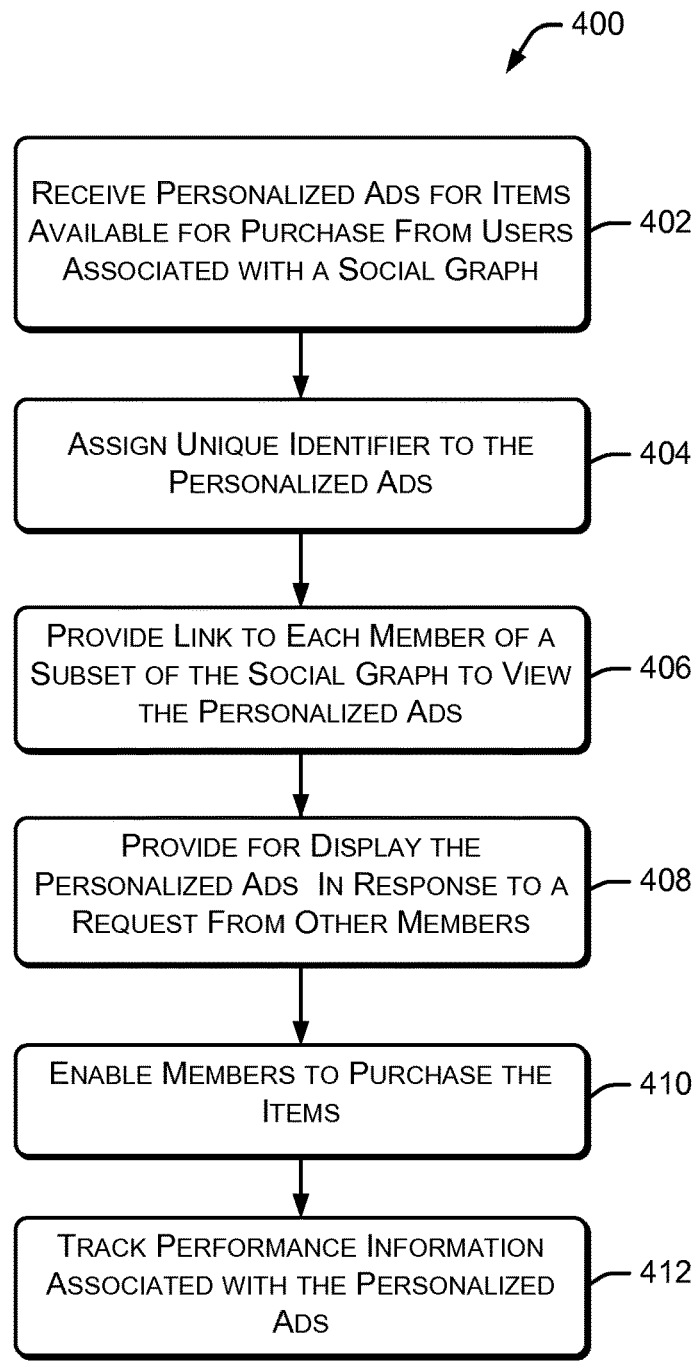
FIG. 4 is a flow diagram for a process of receiving and distributing personalized advertisements to members of a social graph for viewing and purchase of the items featured in the personal advertisements and tracking performance information tied to the personalized advertisements.
Figure 5:
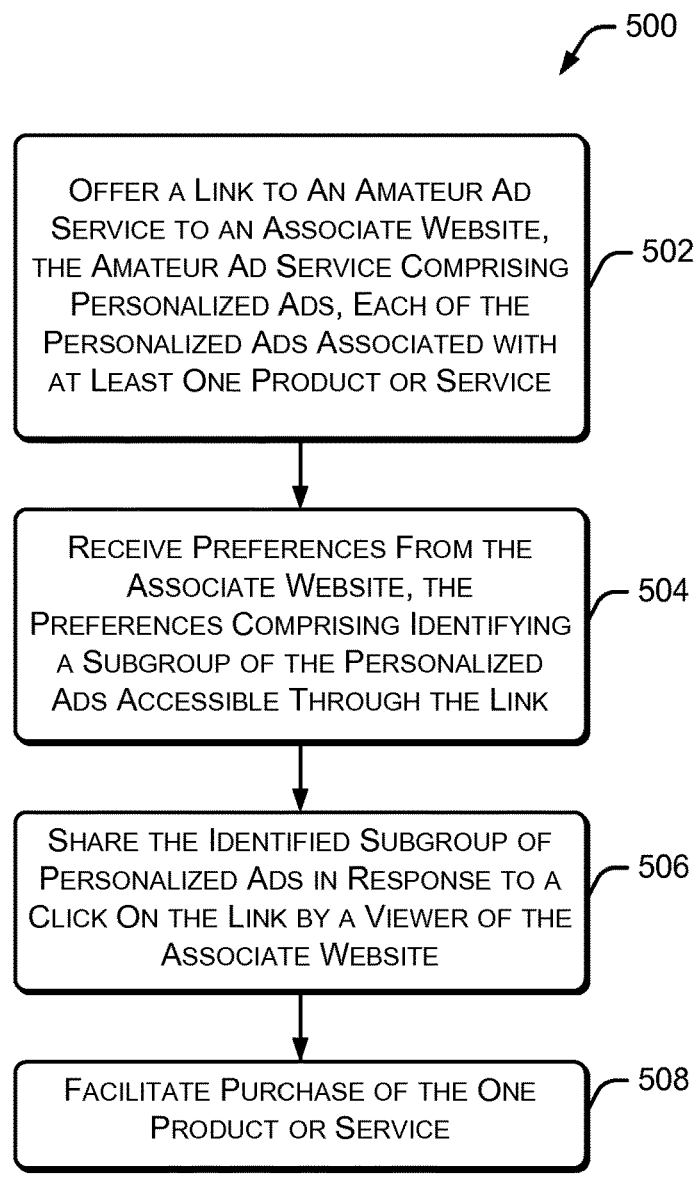
FIG. 5 is a flow diagram for a process of an associate website to link with an amateur advertisement service to display preferred personalized advertisements and to facilitate purchase of the products/services featured in the personalized advertisements.
Figure 6:
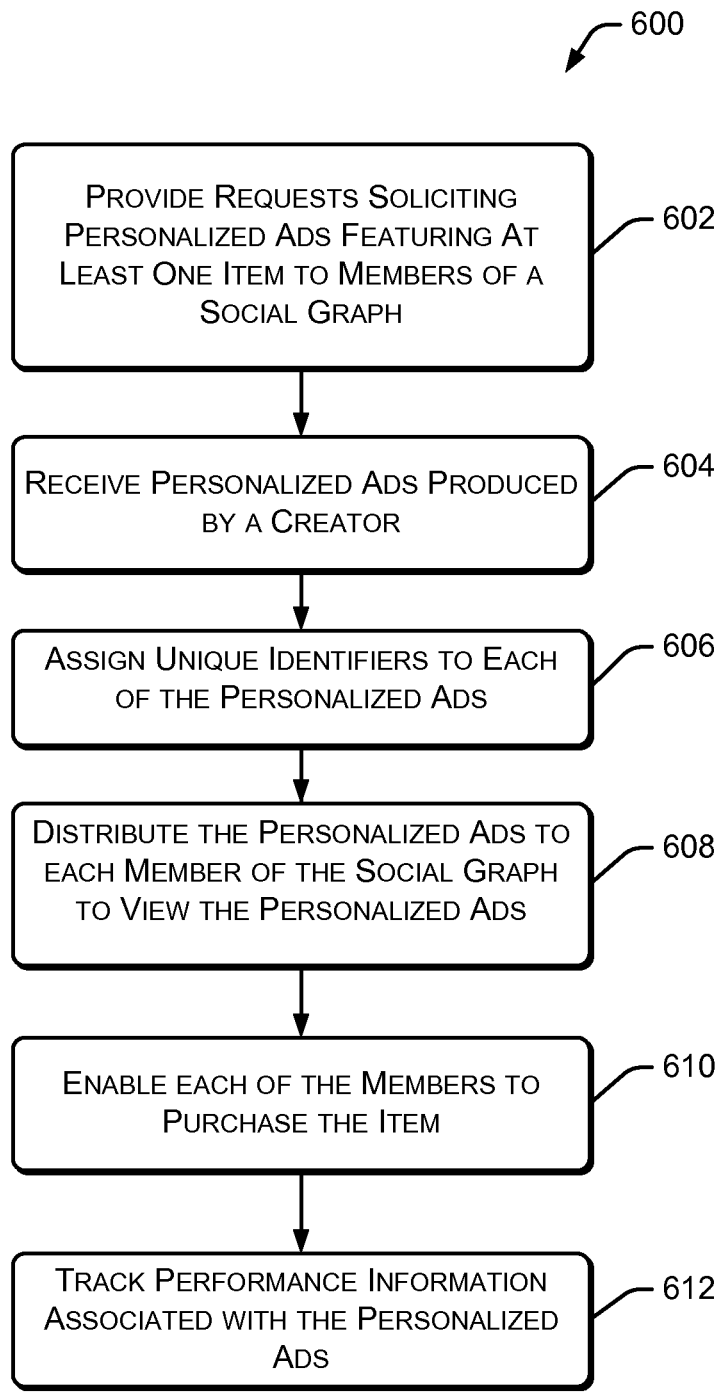
FIG. 6 is a flow diagram for a process of soliciting personalized advertisements from available creators and managing the personalized advertisements received in response to the solicitation.

FIGS. 4-6 describe exemplary processes involved in operating the amateur advertisement architecture 100 of FIG. 1. For ease of understanding, the process 400, (as well as processes 500 in FIG. 5, 600 in FIG. 6, 800 in FIG. 8, 900 in FIG. 9, 1000 in FIGS. 10 and 1100 in FIG. 11) is illustrated as a collection of blocks in a logical flow graph, which represent a sequence of operations or acts that can be implemented in hardware, software, or a combination thereof. In the context of software, the blocks represent computer-executable instructions that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation, and any number of the described blocks can be combined in any order and/or in parallel to implement the process. For discussion purposes, the process 400 is described with reference to the architecture 100 of FIG. 1.

D.1. Managing Personalized Ads with Unique Identifiers in a Social Graph

FIG. 4 shows a process 400 for receiving personalized advertisements 108(1) ... (N) created by users 102(1) ... (N) belonging to a social graph 104(1) ... (N) and distributing the personalized advertisements 108(1) ... (N) to other members in the social graph 104(1) ... (N).

At 402, the amateur ad service 114(1) ... (N) receives personalized ads 108(1) ... (N) for items available for purchase from users 102(1) ... (N) associated with a social graph 104(1) ... (N). In actual practice, each personalized ad 108(1) ... (N) may feature only one item but, some personalized ads 108(1) ... (N) may feature more than one item with each item being related or unrelated with one another. In some cases, the personalized ads 108((1) ... (N) are created in response to advertisement requests 110(1) ... (N) submitted by manufacturers 112(1) ... (N) solicit the ads 108(1) ... (N). Also, the manufacturers 112(1) ... (N) may cooperate with one another and pool their resources to solicit high demand creators 102(1) ... (N) to produce ads 108(1) ... (N) that may otherwise be unavailable to a single manufacturer 112(1) ... (N).

At 404, creators 102(1) ... (N) may input information to the personal ad manager 120 to assist in assigning a unique identifier to the personalized ads 108(1) ... (N). As fully discussed previously, the unique identifiers serve to organize the personalized ads 108(1) ... (N) and may correspond to the featured items, creators 102(1) ... (N), category, date, etc. associated with the personalized ads 108(1) ... (N). After assigning unique identifiers, at 406, links are provided to each member of a subset of the social graphs 104(1) ... (N) to view the personalized ads 108(1) ... (N). The subset may include members connected to one another based on additional shared traits or interests, including friends, family, location, and so on.

At 408, the personalized ads 108(1) ... (N) are provided for display in response to a request. As discussed previously, the personalized ads 108(1) ... (N) can be displayed in a pop up player, in a browser, or some other type of viewer.

At 410, members may be permitted to purchase items being presented in the ads 108, either during or after the personalized ads 108(1) ... (N) have ended. That is, the viewer may purchase the item(s) featured in the personalized ads 108(1) ... (N) at any time after the personalized ads 108(1) ... (N) have started. In one case, retailers 128(1) ... (N) designated in the ad requests 110(1) ... (N) accept and fulfill the purchase requests received from the viewers 132(1) ... (N). In another case, viewers 134(1) ... (N) are led to another website to purchase the item.

At 412, performance information is tracked to determine the effectiveness of the personalized ads 108(1) ... (N) or the creators 102(1) ... (N). The performance information may be collected and available to the creators 102(1) ... (N) or the manufacturers 112(1) ... (N).

D.2. Associate Website with a Link to Amateur Ad Services to Present Personalized Ads in the Form of Shopping Style Ads or Click Through Ads.

FIG. 5 shows a process 500 for distributing personalized ads 108(1) ... (N) through associate websites 130(1) ... (N) having links to the amateur ad service 114(1) ... (N).

At 502, a link to the amateur ad service 114(1) ... (N) having personalized ads 108(1) ... (N) featuring a product or service is offered to the associate websites 130(1) ... (N). In one case, the associate websites 130(1) ... (N) may be related to the product or service featured in the personalized ads 108(1) ... (N). For instance, a website for shipping services may present personalized ads 108(1) ... (N) for office supplies, transportation, airfare, and so on.

At 504, the amateur ad service 114(1) ... (N) receives preferences from the associate websites 130(1) ... (N) selecting a subset of the personalized ads 108(1) ... (N) accessible through the link. In a certain implementation, the preferences can set the format associated with how the personalized ads 108(1) ... (N) are displayed. Specifically, the personalized ads 108(1) ... (N) can be provided in shopping style or click-through. For example, clicking on a link may trigger a pop up media player to start the personalized ads 108(1) ... (N) while in an alternative format, clicking on the link allows the personalized ads 108(1) ... (N) to play with the personalized ads 108(1) ... (N) becomes a hotlink to a target site. The target site may be associated with the item featured in the personalized ads 108(1) ... (N), the creator 102(1) ... (N), the retailers 128(1) ... (N), the manufacturers 112(1) ... (N) and other sites related to the subject matter of the personalized ads 108(1) ... (N) or the associate websites 130(1) ... (N). In another implementation, the preferences can originate from information stored in a cookie on a viewer's web browser. For example, the cookie can authenticate the viewer and facilitate identification of the social graph 104(1) ... (N) affiliated with the viewer to identify networks of individuals or organizations connected to the viewer. These preferences may be utilized to present the viewer with certain personalized ads 108(1 ... (N) created by the individuals or organizations in the viewer's social graph 108(1) ... (N). For example, a viewer may visit a website for an airline to research flight information while planning a weekend getaway to Las Vegas. Based on preference information stored on a cookie in the viewer's web browser, it is determined that several friends of the viewer, each belonging to her social graph, have created personalized advertisements specific to Las Vegas, the airline, casinos, restaurants, shopping, nightclubs, etc. Accordingly, these personalized ads can be presented to the viewer for display over other personalized ads related to the same subject matter.

At 506, personalized ads 108(1) ... (N) from the selected subgroup are shared in response to a click on the link by viewers of the associate websites 130(1) ... (N). As mentioned above, the subgroup can consist of personalized ads 108(1) ... (N) that have in common the same creators 102(1) ... (N), products, services, or identification information (e.g. unique identifiers).

At 508, the amateur ad service 114(1) ... (N) may also facilitate purchase of the product or service featured in the personalized ads 108(1) ... (N).

FIG. 6 shows a procedure 600 for soliciting personalized ads 108(1) ... (N) from a member of a social graph 104(1) ... (N). As previously discussed, the ad request 110(1) ... (N) may be solicitations from manufacturers 112(1) ... (N) of the items to be feature in the personalized ads 108(1) ... (N).

D.3. Soliciting Personalized Ads

At 602, ad requests 110(1) ... (N) soliciting personalized ads 108(1) ... (N) featuring an item(s) available for purchase are made available to members of a social graph 104(1) ... (N). At 604, the amateur ad service 114(1) ... (N) can receive the personalized ads 108(1) ... (N) created by creators 102(1) ... (N). In one case, the creators 102(1) ... (N) can be members of the social graph 104(1) ... (N). As previously mentioned the requests 110(1) ... (N) may specify eligibility requirements for the creators 102(1) ... (N) including experience, successful performance of creating personalized ads, service fee, and so on. In some cases, in the event the creators 102(1) ... (N) do not meet a minimal threshold of eligibility, the providers 112(1) ... (N) of the requests 110(1) ... (N) may reject the ad(s) 108(1) ... (N) submitted by these creators 102(1) ... (N). In other cases, the qualifications of the creators 102(1) ... (N) are not factored when receiving the personalized ads 108(1) ... (N).

At 604, the personalized ads 108(1) ... (N) produced in response to the requests 110(1) ... (N) are received by the amateur ad service 114(1) ... (N).

At 606, the personalized ad manager 120 may assign unique identifiers to each of the personalized ads 108(1) ... (N) in order to organize and track attributes for each of the personalized ads 108(1) ... (N).

At 608, the personalized ads 108(1) ... (N) are distributed to each member of the social graph 104(1) ... (N) for viewing. As mentioned previously, the personalized ads 108(1) ... (N) may be distributed from the amateur ad service 114(1) ... (N) in various ways. In one case, viewers 132(1) ... (N) may be automatically notified by the personalized ad manager 120 that a personalized ad 108(1) ... (N) created by a member of her network 104(1) ... (N) is available for viewing. Notice may take the form of a message with a link therein to the personalized ads 108(1) ... (N). In another case, viewers 132(1) ... (N) may conduct a search for the personalized ads 108(1) ... (N) or view them via channels. In yet another case, viewers 132(1) ... (N) of the personalized ads 108(1) ... (N) may forward them along to others.

At 610, viewers 132(1) ... (N) of the personalized ads 108(1) ... (N) may purchase the item featured in the personalized ads 108(1) ... (N) before, during or at the end of the personalized advertisement 108(1) ... (N).

At 612, performance information associated with the personalized ads 108(1) ... (N) is tracked. As mentioned above, the viewers' interaction with the personalized ads 108(1) ... (N) may affect the success or lack of success of the personalized ads 108(1) . . . (N), ultimately contributing to the assessment of the creators 102(1) . . . (N) responsible for the personalized ads 108(1) . . . (N) and the amount of compensation received by them.

E. Exemplary Flow of Revenue

Figure 7:
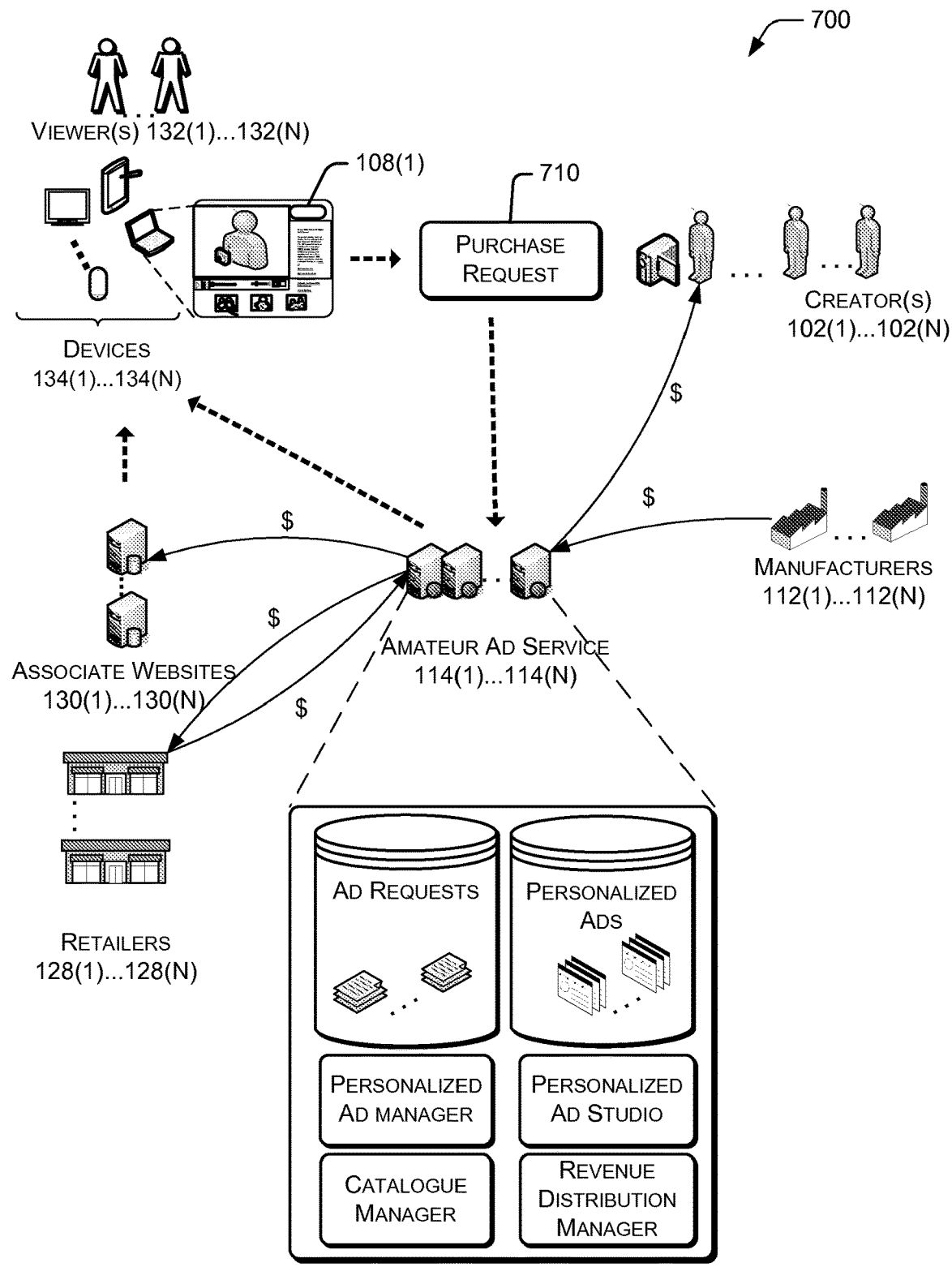
FIG. 7 illustrates how revenue generated by the display of personalized advertisements and/or the purchase of items featured therein is collected and distributed to the entities associated with the amateur advertisement network.

FIG. 7 shows a revenue flow and distribution arrangement 700 in which revenue generated by the amateur ad architecture 700 is distributed among one or more parties, such as the creators 102(1) . . . (N), associate websites 130(1) . . . (N) and the amateur advertisement services 114(1) . . . (N). As noted above, the personalized ads 108(1) . . . (N) may generate revenue in a number of ways. For instance, revenue may be generated based upon the quantity and quality of views of the personalized ads 108(1) . . . (N). In addition to or in the alternative, revenue may also be tied to the purchase of the featured item(s) presented in the personalized advertisements 108(1) . . . (N). In some cases, the purchase occurs by way of a purchase request 710 originating from the viewers 132(1) . . . (N) through their respective electronic devices 134(1) . . . (N). The revenue from the purchases initially go to the manufacturers 112(1) . . . (N), retailers 128(1) . . . (N), or the amateur advertisement service 114(1) . . . (N) as represented by the revenue arrows. Thereafter, a portion of the revenues may be distributed to one or more parties, including the creators 102(1) . . . (N) and the ad services 114(1) . . . (N).

For example, the manufactures 112(1) . . . (N) may pay the ad services to submit ad requests 108(1) . . . (N) to be stored and accessible to creators 102(1) . . . (N) interested in earning income for creating personalized ads 108(1) . . . (N) in conformity to the ad requests 110(1) . . . (N). Moreover, the retailers 128(1) . . . (N) may seek designation in the personalized advertisements 108(1) . . . (N) as the supplier of the item featured in the personalized ads 108(1) . . . (N) and may pay a fee to attain this status. Other entities may also provide payment to be associated with the personalized ads. In the event the creators 102(1) . . . (N) produce the personalized ads 108(1) . . . (N), acceptable to the manufacturers 112(1) . . . (N), the creators 102(1) . . . (N) may receive payment from the manufacturers 112(1) . . . (N). The amount of payment may be set by the manufacturers 112(1) . . . (N) or the creators 102(1) . . . (N). In the event the personalized ads 108(1) . . . (N) are displayed, payment may be distributed to the creators 102(1) . . . (N) and/or the associate websites 130(1) . . . (N), if the viewer 132(1) . . . (N) selected the personalized ads 108(1) . . . (N) from a link displayed on the associate website 130(1) . . . (N). In the event the viewer 132(1) . . . (N) decides to purchase the featured item in the personalized ads 108(1) . . . (N), a purchase order 710 is generated and relayed through the amateur ad service 114(1) . . . (N) to the retailers 128(1) . . . (N) to supply the item purchased. Revenue generated based on the purchase may be distributed by the amateur ad service 114(1) . . . (N) to the creators 102(1) . . . (N), associate websites 130(1) . . . (N) and the amateur ad services 114(1) . . . (N).

In one implementation, a collection of ad requests 116 is provided. The collection of ad requests 116 can be submitted by manufacturers 112(1) . . . (N) of products or services and contain rules governing the content for the personalized ads 108(1) . . . (N). Also, the collection of ad requests 116 can have eligibility requirements for the creators 102(1) . . . (N) of the personalized ads 108(1) . . . (N). In yet another implementation, the collection of ad requests 116 can include designated retailers 128(1) . . . (N) to supply the products or services featured in the personalized ads 108(1) . . . (N).

The generated revenue may be apportioned according to a predefined agreement between the creators 102(1) . . . (N), associate websites 130(1) . . . (N), manufacturers 112(1) . . . (N) or amateur advertisement service 114(1) . . . (N).

F. Exemplary Procedures for Generating and Apportioning Revenue

Figure 8:
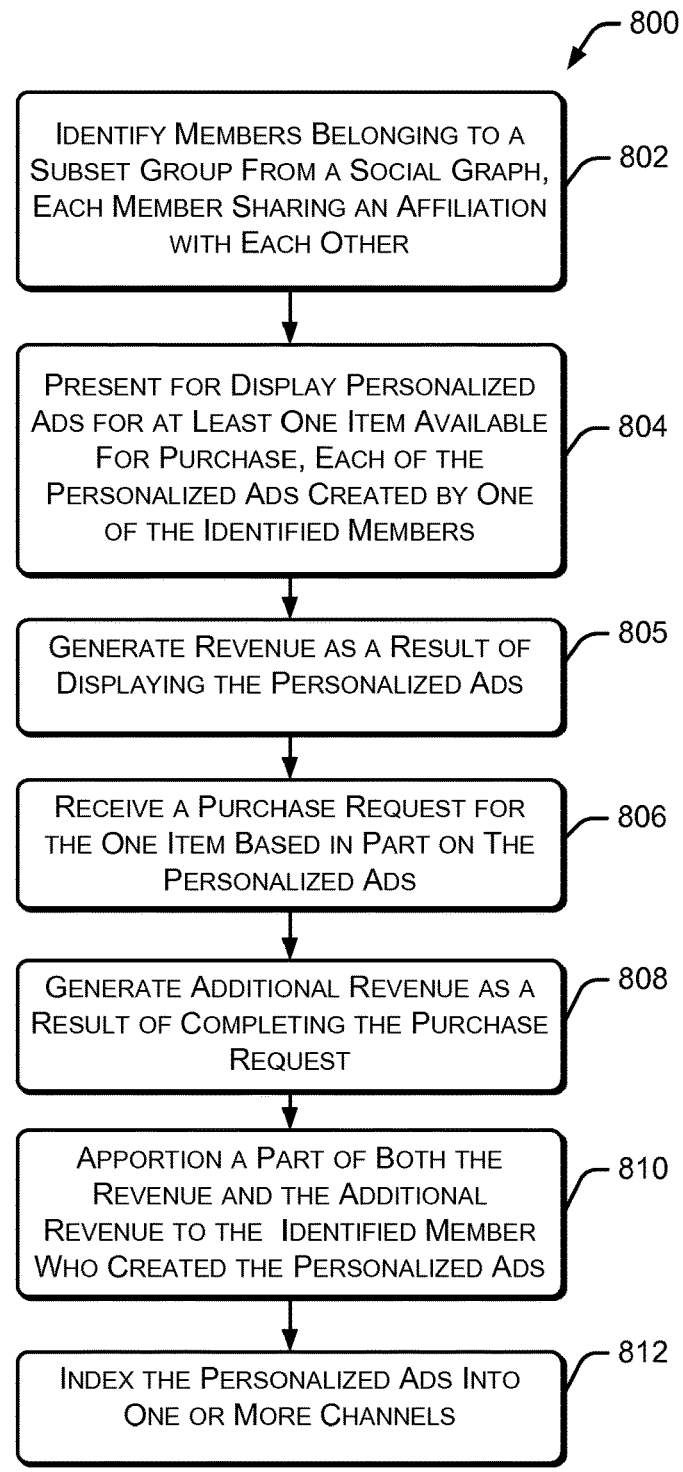
FIG. 8 is a flow diagram for a process of generating and apportioning revenue from the purchase of items featured in personalized advertisements to the creators of the personalized advertisements and indexing the personalized advertisements into channels.

F.1. Generating Revenue Based on Sale of Featured Item and Apportioning Part of the Generated Revenue to Creator FIG. 8 shows a procedure 800 implemented by the amateur ad service 114(1) . . . (N) for apportioning revenue to creators 102(1) . . . (N) of personalized ads 108(1) . . . (N) based on the purchase of items featured in the personalized ads 108(1) . . . (N).

At 802, the amateur ad service 114(1) . . . (N) identifies members belonging to a subset group from a social graph 104(1) . . . (N). In one case, the subset group may include particular members of a social graph 104(1) . . . (N) that are affiliated with one another based on the same or similar trait, characteristic or interest. For example, members of a social graph 104(1) . . . (N), like the social site operated under the brand Facebook®, can further belong to groups sharing a common affinity for Lexus® automobiles, PAC 10 football, comedies, and so on. Moreover, the members of the subset can be added by current members, share similar or the same demographic data, location and so on.

At 804, personalized ads 108(1) . . . (N) created by a member of the subgroup are presented for display to other members of the subgroup. In block 805, revenue is generated as a result of displaying the personalized ads 108(1) . . . (N) to a viewer.

In block 806, a purchase request 710 for the item(s) featured in the personalized ads 108(1) . . . (N) may be submitted by the members who have viewed the personalized ads 108(1) . . . (N). As described above, buying options may appear together with the personalized ads 108(1) . . . (N). In another implementation, viewers 132(1) . . . (N) may be directed to another website to purchase the items.

At 808, additional revenue is generated as a result of completing the purchase request 710. In block 810, a part of both the generated revenue and the additional revenue is apportioned to the creator 102(1) . . . (N) of the personalized ads 108(1) . . . (N).

Finally, in block 812, the personalized ads 108(1) . . . (N) may be indexed into channels to provide viewers 132(1) . . . (N) with an organized and convenient way to view the personalized ads 108(1) . . . (N). In one case, the index organizes the personalized ads 108(1) . . . (N) according to unique identifiers, ad type, content, creators, items, popularity, recommendations and so forth.

Figure 9:
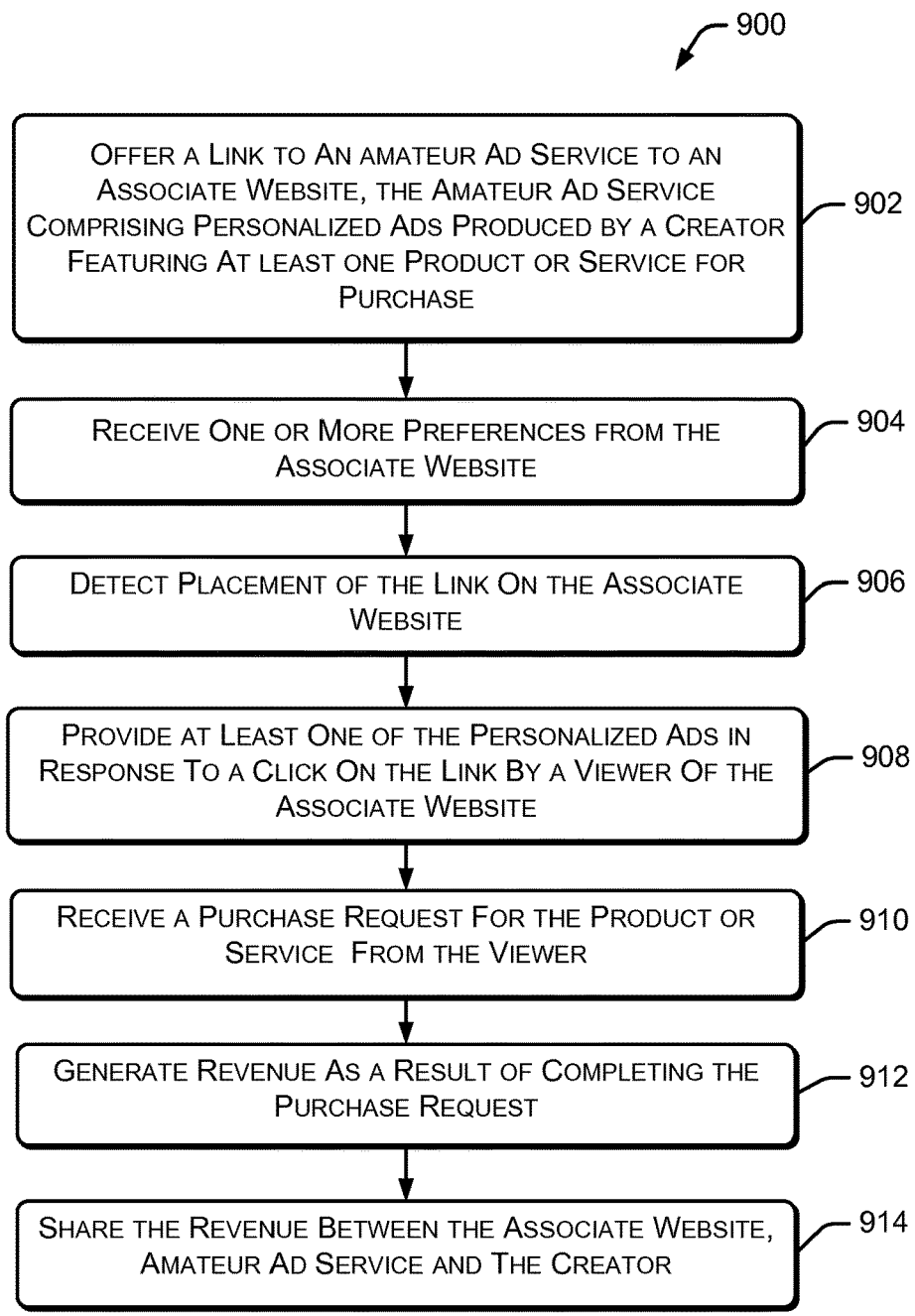
FIG. 9 is a flow diagram for a process of an associate website to link with an amateur advertisement network to display preferred personalized advertisements and to generate and share revenue stemming from the purchase of the products/services featured in the personalized advertisements between the associate website, amateur advertisement network and creator of the personalized advertisements.

F.2. Associate Website Linking to Amateur Ad Service to Generate and Distribute Revenue Based on Purchase of Item Among Associate Website, Amateur Ad Service and Creator FIG. 9 shows a procedure 900 for generating and sharing the revenue from purchases of items made from personalized ads 108(1) . . . (N) involving associate websites 130(1) . . . (N), creators 102((1) . . . (N) of the personalized ads 108(1) . . . (N) and an amateur ad service 114(1) . . . (N).

At 902, a link to the amateur ad service 114(1) . . . (N) is offered to associate websites 130(1) . . . (N) to access personalized ads 108(1) . . . (N) produced by creators 102(1) . . . (N) and featuring a product or service for purchase. As provided previously, associate websites 130(1) . . . (N) can be required to register with the amateur ad service 114(1) . . . (N) in order to be able to provide the link. In one case, registration may require the associate websites 130(1) . . . (N) to agree to certain terms and conditions governing their use of the link and compensation details. In another case, the content of the associate websites 130(1) . . . (N) are related to the product or service featured in the personalized ads 108(1) . . . (N).

At 904, the amateur ad service 114(1) . . . (N) receives preferences from the associate websites 130(1) . . . (N). As detailed previously, the preferences can select a class of personalized ads 108(1) . . . (N) that can be provided through the link. In one case, the preferences can select personalized ads 108(1) . . . (N) that are related to the content of the associate websites 130(1) . . . (N). For example, a website devoted to Chevy trucks may select personalized ads for truck accessories, off-roading equipment, and so forth. In another example, the preferences may include the type of ad (e.g. comedy, romance, children, adult, women, men, etc.), creators 102(1) . . . (N), products or services featured in the ads, music, genre, popularity, playback time, and so on.

At 906, placement of the link on the associate websites 130(1) . . . (N) is detected.

At 908, viewers 132(1) . . . (N) may click on the link and be provided with the personalized ads 108(1) . . . (N). As mentioned above, the personalized ads 108(1) . . . (N) may be presented in a pop-up player. In another implementation, the personalized ads 108(1) . . . (N) are presented through a browser.

At 910, a purchase request for the product or service featured in the personalized ads 108(1) . . . (N) is received from viewers 132(1) . . . (N). In one implementation, the personalized ads 108(1) . . . (N) designate retailers 128(1) . . . (N) to supply the items.

At 912, revenue is generated upon completion of the purchase request 710.

At 914, the generated revenue is shared between the associate websites 130(1) . . . (N), amateur ad service 114(1) . . . (N) and the creator 102(1) . . . (N) of the personalized ads 108(1) . . . (N) that are attributable to the purchase of the products or services. In one implementation, the sharing is apportioned based on a predefined agreement.

Figure 10:
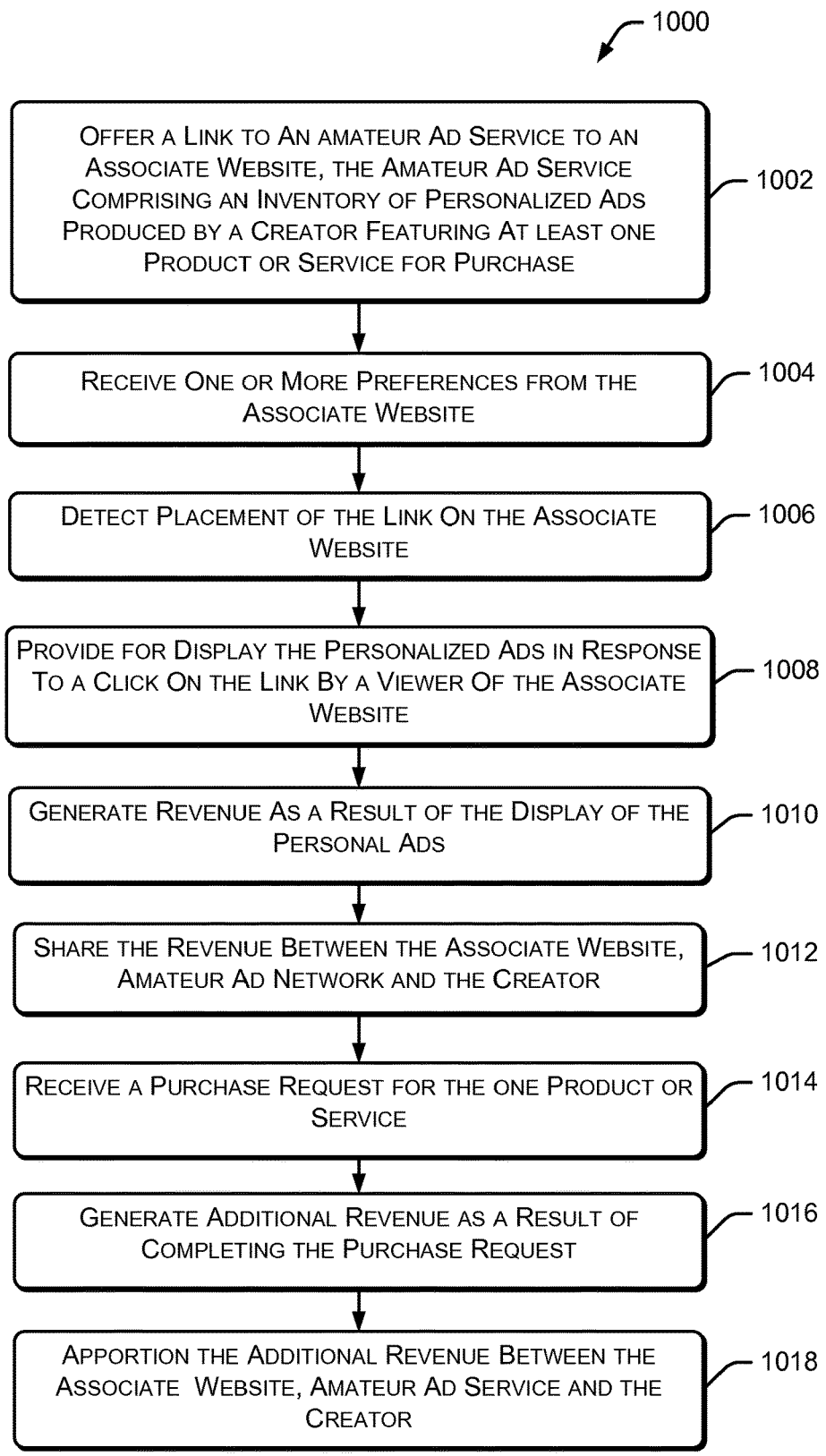
FIG. 10 is a flow diagram for a process of an associate website to link with an amateur advertisement network to display preferred personalized advertisements and to generate and share revenue stemming from the display and/or purchase of the products/services featured in the personalized advertisements between the associate website, amateur advertisement network and creator of the personalized advertisements.

F.3. Associate Website Linking to Amateur Ad Service to Generate and Distribute Revenue Based on Viewing of Personalized Ads and/or Purchase of Item Among Associate Website, Amateur Ad Service and Creator FIG. 10 shows a procedure 1000 for generating and sharing revenue based on displaying personalized ads 108(1) . . . (N) and purchasing products or services featured in the personalized ads 108(1) . . . (N) between an amateur ad service 114(1) . . . (N), associate websites 130(1) . . . (N) and/or creators 102(1) . . . (N) of personalized ads 108(1) . . . (N)).

At 1002, a link to the amateur ad service 114(1) . . . (N) is offered to an associate website 130(1) . . . (N) to access the personalized ads 108(1) . . . (N) produced by creators 102((1) . . . (N) and featuring a product or service for purchase. In a particular case, the personalized ads 108(1) . . . (N) can be created in response to requests 110(1) . . . (N) from manufacturers 112(1) . . . (N) or providers of the items to be featured in the personalized ads 108(1) . . . (N). Furthermore, the requests 110(1) . . . (N) may provide guidelines for controlling the content of the personalized ads 108(1) . . . (N) and the minimal qualifications for the creators 102(1) . . . (N).

At 1004, preferences are received from the associate websites 130(1) . . . (N). As detailed previously, the preferences can select a class of personalized ads 108(1) . . . (N) that can be provided through the link. In one case, the preferences can select personalized ads 108(1) . . . (N) featuring products or services that are complementary to the content of the associate websites 130(1) . . . (N). In other cases, the personalized ads 130(1) . . . (N) feature unrelated products or services vis-à-vis the associate websites' 130(1) . . . (N) content may be preferred. In yet another case, the preferences can specify a category of the personalized ads 108(1) . . . (N) sharing the same or similar unique identifiers, ad type, content, creators 102(1) . . . (N), items, popularity, recommendations and so forth.

At 1006, placement of the link is detected. In block 1008, the personalized ads 108(1) . . . (N) are presented for display upon a click on the link by viewers 132(1) . . . (N) of the associate websites 130(1) . . . (N).

At 1010, revenue is generated as a result of displaying the personalized ads 108(1) . . . (N). As discussed previously, revenue may be based on a cost per click, cost per action, cost per impression and so on.

At 1012, the generated revenue from displaying the ads 108(1) . . . (N) is shared between the associate websites 130(1) . . . (N), amateur ad service 114(1) . . . (N), and/or the creators 102(1) . . . (N) of the personalized ads 108(1) . . . (N). In one case, sharing of the generated revenue is governed by a predefined agreement.

At 1014, a purchase request for the product or service featured in the personalized ads 108(1) . . . (N) is received.

At 1016, additional revenue is generated for completing the purchase request 710.

At 1018, the additional revenue is apportioned to the associate websites 130(1) . . . (N), amateur ad service 114(1) . . . (N), and/or the creators 102(1) . . . (N) of the personalized ads 108(1) . . . (N). In one case, the terms for apportioning the revenue and additional revenue can be predefined by agreement.

F.4. Generating Revenue from Personalized Ads and Distributing to the Creator

Figure 11:
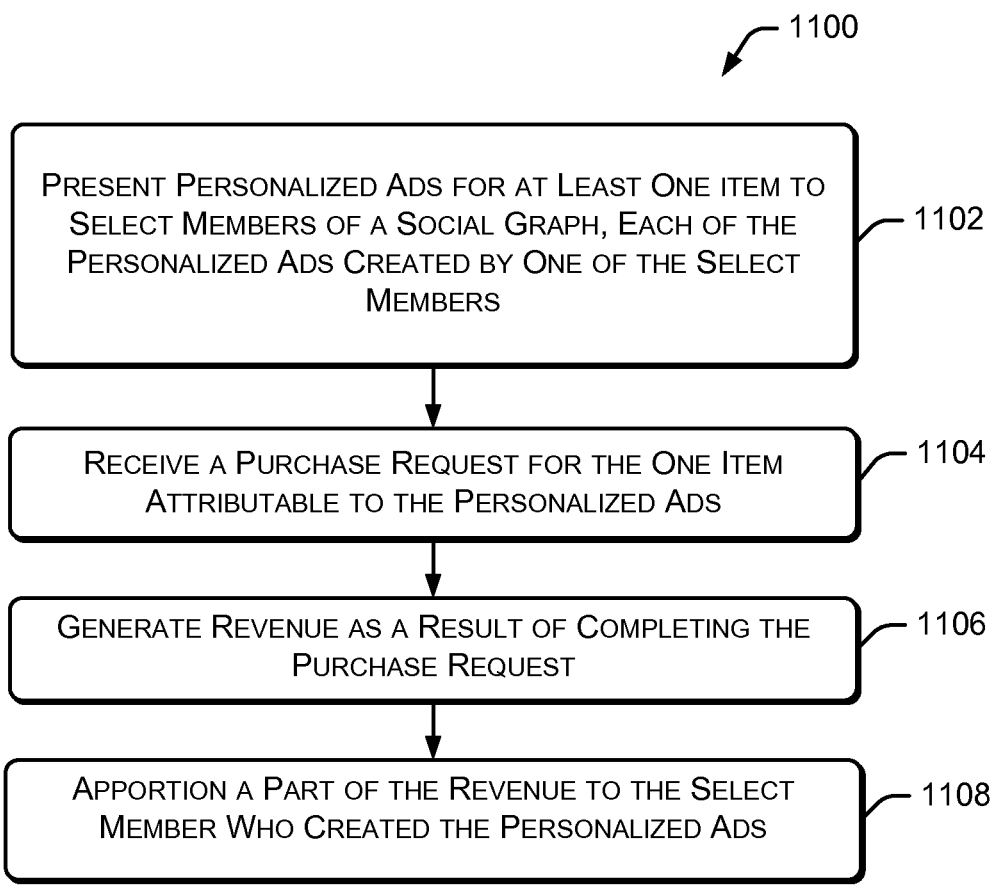
FIG. 11 is a flow diagram for a process of generating and apportioning revenue from the completion of a purchase of an item featured in a personalized advertisement to the creator of the personalized advertisement.

FIG. 11 shows a procedure 1100 for apportioning revenue to creators 102(1) . . . (N) of personalized ads 108(1) . . . (N) responsible for purchases made by members of a social graph 104(1) . . . (N) for the featured item(s) of the personalized ads 108(1) . . . (N).

At 1102, the personalized ads 108(1) . . . (N) are presented featuring an item available for purchase to select members of a social graph 104(1) . . . (N). The personalized ads 108(1) . . . (N) are created by members 102(1) . . . (N) of the social graph 104(1) . . . (N). In one implementation, revenue is generated from the presentation of the personalized ads 108(1) . . . (N). Further, the generated revenue is apportioned to the creator 102(1) . . . (N).

At 1104, a purchase request 710 for the item is received and attributed to the personal ads 108(1) . . . (N).

At 1106, revenue is generated as a result of completing the purchase request 710.

At 1108, a part of the generated revenue is apportioned to the member who created 102(1) . . . (N) the personalized ads 108(1) . . . (N).

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computerized method, comprising:
receiving, at a server of an advertisement service from an associate website, a request for an advertisement for a viewer upon activation of a link in the associate website by the viewer, the request identifying an item available for purchase;

determining, by the server and based at least in part on cookie information associated with the viewer, that the viewer belongs to a subset group of a social graph;

identifying, by the server, a personalized advertisement in a database previously submitted to the advertising service by a member belonging to the subset group and sharing an affiliation with the viewer, the personalized advertisement having been created by the member for the item available for purchase;

causing, by the server, display of an electronic page by a viewer device of the viewer, the electronic page having a user interface that presents information about the item available for purchase and plays the personalized advertisement with a media player;

receiving, by the server, input indicating a user interaction with the personalized advertisement through the media player;

determining, by the server, a display revenue amount as a result of a display of the personalized advertisement;

determining, by the server, that the user interaction indicates a user disinterest in the personalized advertisement;

updating, by the server, the display revenue amount by decreasing the display revenue amount based at least in part on the user disinterest;

receiving, by the server and from the viewer device, a purchase request for the item based in part on the personalized advertisement;

determining, by the server, a purchase revenue amount as a result of completing the purchase request; and apportioning, by the server, a part of both the display revenue amount and the purchase revenue amount among the advertisement service, the associate website, and the member.

2. The computerized method of claim 1, wherein the affiliation comprises one or more from a group comprising member selection, demographic data, location, and a common interest.

3. The computerized method of claim 1, wherein the personalized advertisement is created in response to a request submitted by a provider of the item.

4. The computerized method of claim 3, wherein the request comprises one or more rules from a group comprising content of the personalized advertisement, qualifications for a creator of the personalized advertisement, compensation for creating the personalized advertisement, and apportioning the revenue.

5. The computerized method of claim 1, wherein the purchase request is generated from a purchase offer provided as part of the personalized advertisement.

6. The computerized method of claim 1, wherein the apportioning comprises distributing the part of both the display revenue amount and the purchase revenue amount according to a predefined agreement.

7. The computerized method of claim 1, further comprising indexing the personalized advertisement into one or more channels, wherein the indexing comprises organizing the personalized advertisement according to at least one of a unique identifier, advertisement type, advertisement content, creator, item, popularity, or recommendation.

8. The computerized method of claim 1, wherein the user interaction indicating the user disinterest is a navigation control associated with at least a navigation of the personalized advertisement.

9. A computerized method, comprising:

providing, by a server of an amateur advertising service, a user interface for display on an electronic page;

offering, by the server and to an associate website, a link to the amateur advertisement service, the amateur advertisement service storing and distributing personalized advertisements produced by a creator belonging to a subset group of a social graph, individual ones of the personalized advertisements featuring a product or service for purchase;

receiving, by the server, a preference from the associate web site, wherein the preference selects a class of the personalized advertisements accessible through the link to the amateur advertisement service;

detecting, by the server, placement of the link on the associate web site;

receiving, by a server from the associate website, a request for an advertisement for a viewer upon activation of the link in the associate website by the viewer;

determining, by the server and based at least in part on cookie information associated with the viewer, that the viewer belongs to the subset group of the social graph;

providing, by the server in the user interface, at least one of the personalized advertisements produced by the creator belonging to the subset group in response to the activation of the link by the viewer of the associate web site;

determining, by the server, a display revenue amount based at least in part on the providing the at least one of the personalized advertisements in the user interface;

receiving, by the server, input indicating a user interaction with the user interface;

determining, by the server, that the user interaction indicates a user disinterest in the at least one of the personalized advertisements;

reducing, by the server, the display revenue amount to generate an updated display revenue amount based at least in part on the user disinterest;

receiving, by the server, a purchase request for the product or service from the viewer;

determining, by the server, a purchase revenue amount as a result of completing the purchase request; and sharing, by the server, the updated display revenue amount and the purchase revenue amount between the associate website, the amateur advertisement service, and the creator.

10. The computerized method of claim 9, wherein the associate website is related to the product or service.

11. The computerized method of claim 9, wherein the personalized advertisements identify a retailer to supply the product or service.

12. The computerized method of claim 9, wherein the preference comprises a selection of one or more from a group comprising advertisement type, advertisement content, creators, products, services, shopping format, or click through format.

13. The computerized method of claim 9, wherein the preference comprises information stored on a web browser.

14. The computerized method of claim 9, wherein the sharing comprises apportioning the updated display revenue amount and the purchase revenue amount according to a predefined agreement.

15. A computerized method, comprising:

providing, by a server of an amateur advertisement service, a user interface;

offering, by the server and to an associate website, a link to the amateur advertisement service, the amateur advertisement service storing an inventory of personalized advertisements, individual ones of the personalized advertisements having been produced by a creator belonging to a subset group of a social graph and featuring a product or service for purchase;

receiving, by the server and from the associate website, a preference regarding the personalized advertisements to be provided by the link;

detecting, by the server, placement of the link on the associate web site;

receiving, by a server from the associate website, a request for an advertisement for a viewer upon activation of the link in the associate website by the viewer;

determining, by the server and based at least in part on cookie information associated with the viewer, that the viewer also belongs to the subset group of the social graph;

providing, by the server in the user interface, one or more of the personalized advertisements produced by the creator belonging to the subset group of the social graph in response to the activation of the link by the viewer of the associate website;

receiving, by the server, input indicating a user interaction with the user interface;

determining, by the server, a display revenue amount as a result of the providing the one or more of the personalized advertisements;

determining, by the server, that the user interaction indicates a user disinterest in the one or more personalized advertisements;

reducing, by the server, the display revenue amount to generate an updated display revenue amount based at least in part on the user disinterest; and sharing, by the server, the updated display revenue amount between the associate website, the amateur advertisement service that stores and distributes the personalized advertisements, and the creator.

16. The computerized method of claim 15, wherein the personalized advertisements are created in response to a request from a manufacturer of the product or provider of the service soliciting the personalized advertisements.

17. The computerized method of claim 15, wherein the request further comprises a rule directing content of the personalized advertisements and a qualification for the creator.

18. The computerized method of claim 15, wherein the preference specifies a category based in part upon a unique identifier, an advertisement type, an advertisement content, a creator, an item, a popularity, or a recommendation.

19. The computerized method of claim 15, wherein generating the display revenue amount comprises determining one or more from a first group comprising cost per click, cost per action, or cost per impression, and wherein reducing the display revenue amount to generate the updated display revenue amount comprises determining that the user interaction comprises one or more from a second group comprising fast forwarding, skipping, pausing, stopping, decreasing a volume, muting the volume, or minimizing the one or more personalized advertisements.

20. The computerized method of claim 15, wherein the updated display revenue amount is shared based in part on a predefined agreement.

21. The computerized method of claim 15, further comprising:

receiving, by the server, a purchase request for the product or service;

generating, by the server, a purchase revenue amount as a result of completing the purchase request; and apportioning, by the server, the purchase revenue amount between the associate website, amateur advertisement service, and the creator.

22. A server system comprising:

a processor;

a memory, accessible by the processor;

a requirement submitted by a product or service provider to solicit a personalized advertisement featuring a product or service, the requirement being stored in the memory;

an inventory including the personalized advertisement, the personalized advertisement produced by a creator belonging to a subset group of a social graph in response to the requirement and being stored in the memory; and one or more computer-executable instructions stored in the memory and executable on the processor to perform operations comprising:

determining, based at least in part on cookie information associated with a viewer, that the viewer also belongs to the subset group of the social graph;

serving the personalized advertisement in a user interface based at least in part on a preference associated with the viewer, wherein the preference identifies the personalized advertisement at an advertisement service accessible by a link;

generating a display revenue amount based on the serving the personalized advertisement in the user interface;

receiving input indicating a user interaction with the user interface;

determining that the user interaction indicates a user disinterest in the personalized advertisement;

reducing the display revenue amount based at least in part on the user disinterest to generate an updated display revenue amount; and disbursing a purchase revenue amount generated by a sale of the product or service and the updated display revenue amount attributable to the personalized advertisement displayed in the user interface.

23. The server system of claim 22, wherein the requirement further comprises a content rule for the personalized advertisement.

24. The server system of claim 22, wherein the requirement further comprises a qualification for a creator of the personalized advertisement.

25. The server system of claim 22, wherein the personalized advertisement further designates a supplier of the product or service.

26. The server system of claim 22, wherein disbursement of the purchase revenue amount and the updated display revenue amount comprises apportioning a percentage of the updated display revenue amount and the purchase revenue amount to a creator of the personalized advertisement served in the user interface.

27. The server system of claim 22, wherein the updated display revenue amount and the purchase revenue amount are disbursed based in part on a predefined agreement.

28. One or more computer-readable media containing machine-readable instructions, the machine-readable instructions implementing operations when executed by a processor, the operations comprising:

providing a user interface for display on an electronic page;

determining, based at least in part on cookie information associated with a viewer of the electronic page, that the viewer belongs to a subset group of a social graph;

presenting, in the user interface, a personalized advertisement for an item to the viewer, the personalized advertisement being created by a member belonging to the subset group of the social graph and being provided to the electronic page based in part on a preference indicated by the electronic page including the user interface, wherein the preference selects the personalized advertisement to be received from an advertisement service when accessed through a link;

receiving input indicating a user interaction with the user interface;

generating a display revenue amount as a result of the presenting the personalized advertisement;

determining that the user interaction indicates a user disinterest in the personalized advertisement;

decreasing the display revenue amount based at least in part on the user disinterest to generate an updated display revenue amount; and apportioning a part of the updated display revenue amount to the member belonging to the subset group of the social graph.

29. The one or more computer-readable media of claim 28, wherein the user disinterest comprises one or more from a group comprising fast forwarding, skipping, pausing, stopping, decreasing a volume, muting the volume, or minimizing the personalized advertisement.

30. The one or more computer-readable media of claim 28, wherein the operations further comprise:

receiving a purchase request for the item attributable to the personalized advertisement;

generating a purchase revenue amount as a result of completing the purchase request; and apportioning a part of the purchase revenue amount to the member who created the personalized advertisement.

31. The one or more computer-readable media of claim 28, wherein the personalized advertisement is created in response to a request soliciting the personalized advertisement.

32. The one or more computer-readable media of claim 28, wherein the viewer and the member are associated with a group, the group sharing a common interest, geographic location, demographic information, or affiliations.

33. The one or more computer-readable media of claim 28, wherein the operations further comprise increasing the display revenue amount based in part on another user interaction indicating an active user interest in the personalized advertisement.

* * * * *